UNITED STATES PATENT OFFICE.

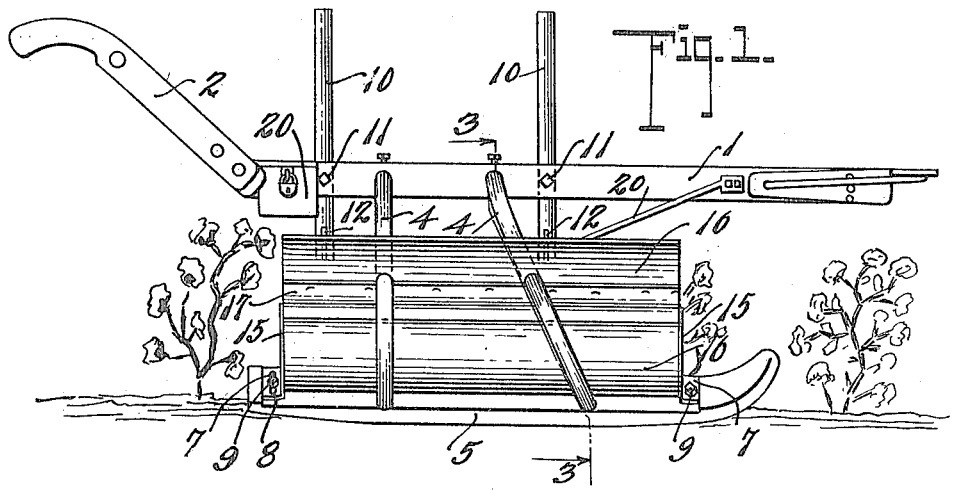
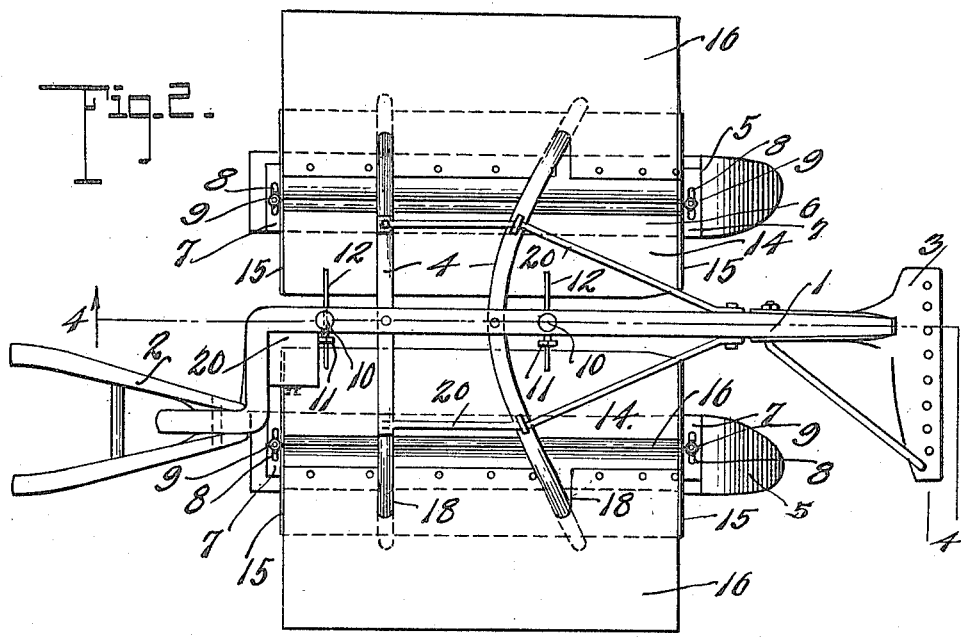
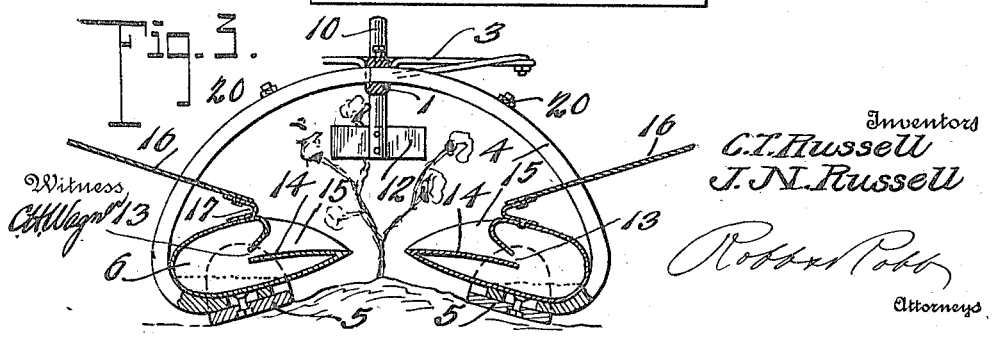

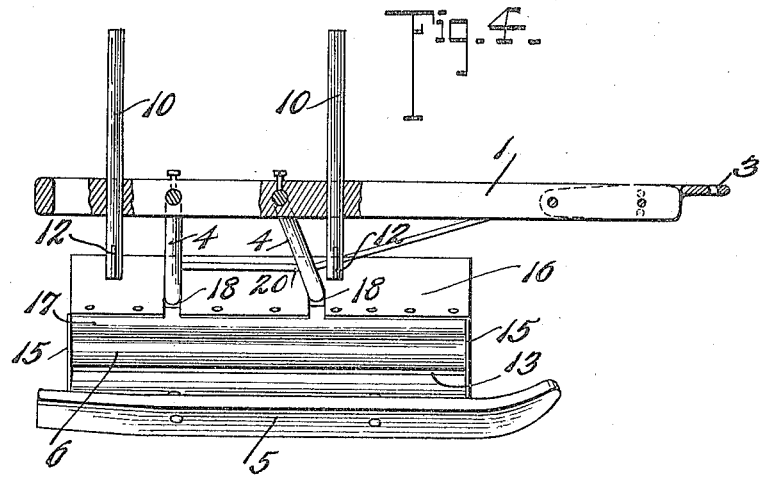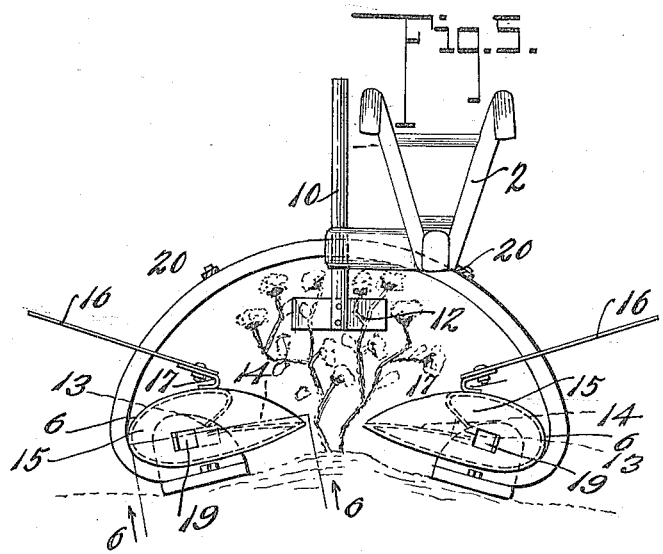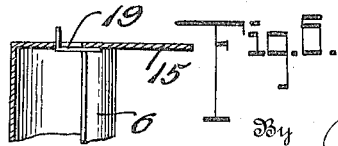

CALVIN T. RUSSELL AND JOHN N. RUSSELL, OF KINSTON, ALABAMA.

INSECT-EXTERMINATOR.

1,213,024.   Specification of Letters Patent.   Patented Jan. 16, 1917.

Application filed August 31, 1916. Serial No. 117,924.

*To all whom it may concern:*

Be it known that we, CALVIN T. RUSSELL and JOHN N. RUSSELL, citizens of the United States, residing at Kinston, in the county of Coffee and State of Alabama, have invented certain new and useful Improvements in Insect-Exterminators, of which the following is a specification.

The present invention appertains to improvements in that type of agricultural implements known as insect exterminators, as particularly designed for removing boll weevils from cotton plants.

The object in view of our invention is to provide a simple implement that may be cheaply manufactured but yet entirely effective for performing the function above referred to.

To this end the device consists of specially shaped receptacles carried by a frame, adjustably arranged with respect to each other for operation at opposite sides of the rows of plants, and intermediate flapping or vibratory elements for dislodging the insects and knocking them into the receptacles.

It is further comprehended to employ extension wings so coöperating with the receptacles as to provide a maximum receiving surface for the insects enabling a greater efficiency in the collection of said insects than would otherwise be the case without such provision.

These and such other objects as may hereinafter appear are attained by the novel construction, combination and arrangement of parts to be hereinafter specifically described and claimed.

Reference will now be had to the accompanying drawings forming a part of this specification, wherein:—

Figure 1 is a side elevation of an apparatus constructed in accordance with our invention. Fig. 2 is a top plan view. Fig. 3 is a transverse sectional view on the line 3—3 of Fig. 1. Fig. 4 is a vertical longitudinal section on the line 4—4 of Fig. 2. Fig. 5 is a rear elevation of the implement. Fig. 6 is a fragmentary sectional view on the line 6—6 of Fig. 5.

Referring to the drawings and specifically describing the invention, 1 indicates a beam provided at one end with the usual handle members 2, the beam having at its opposite end some conventional form of draft connection as indicated at 3. Extending laterally from the beam and depending therefrom are arched arms 4 to each pair of which is connected at opposite sides of the beam a runner 5, said runners being arranged in spaced relation and inclined to conform substantially to the surface of the earth adjacent to the plants of a row at opposite sides of which said runners operate. The inclination of the runners tends to facilitate the movement of the implement by decreasing the frictional engagement with the soil. Supported upon each one of these runners is a receptacle longitudinally arranged with respect to the supporting frame as indicated at 6. At the forward and rear ends of the receptacle are provided flanges 7 each having a transverse slot 8 to accommodate an adjusting bolt 9 by means of which the receptacle is secured to the runner. The adjustable connection for the receptacles permits of their adjustment with relation to each other as controlled mainly by the straightness of the rows of plants and the growth of the latter.

Depending from the beam 1 are vertically arranged standards 10, said standards preferably passing through suitable openings in the beam and being adjustably held by set screws 11. Any desired number of standards may be provided though we have illustrated only a pair of the same in the drawings. At the lower end of each standard is attached a flexible flapping or vibrating element 12 which is preferably of flexible belting or rubber so as to enable these members to vibrate back and forth as they come in contact with the plants.

As hereinbefore premised, the receptacles 6 are peculiar in construction inasmuch as the material of the bottom portion extends inwardly to approximately the central portion of the frame and is then bent back upwardly to project to a point substantially centrally of the receptacle so as to coöperate with the upper portion of the material which is bent inwardly a short distance at about the same point to form a constricted mouth or opening 13. The bending of the lower portion as above described provides a wide receiving surface, indicated 14, upon which the insects which are dislodged by the members 12 may fall adjacent to the mouth of the receptacle, and the inturning of the lateral edges of the material in the manner described tends to prevent the insects from passing out of the mouth.

Each receptacle is provided with closed ends 15, and furthermore each receptacle carries at its upper portion a lateral outwardly extending wing 16 which is detachably connected to the receptacle preferably by an intermediate V-shaped strip 17. The wings are cut out to provide slots 18 to accommodate the lateral arms 4 and to enable the adjustment of the respective receptacles without interference from the wings. The mounting and supporting of the wings 16 as just described tends to permit the same to vibrate during movement of the implement over the rough surface and such vibration causes any of the insects which are thrown by the knocking elements 12 upon said wings to slide off of the wings onto the receiving surfaces 14 of the receptacles, said receiving surfaces being at a slight incline toward the mouth of the receptacle so that the insects finally are delivered thereinto.

In order to permit the receptacles to be cleaned we provide in the rear ends thereof slidable doors 19 through which the insects may be removed. As a matter of convenience the beam carries a receptacle 20 to receive such tools and other articles as may be found necessary and the frame is preferably made rigid by suitable braces 21 which extend from the beam rearwardly to the respective lateral arms 4.

Having thus described our invention, what we claim as new is:—

1. An insect exterminator of the class described comprising a frame, runners secured thereto in spaced relation, receptacles mounted upon said runners and having slotted flanges, means arranged in the slots to adjustably connect the receptacles to the runners, and knocking elements carried by the frame intermediate the receptacles for dislodging insects to be received by said receptacles.

2. An insect exterminator of the class described comprising a frame adapted to be moved over plants to be operated upon, spaced receptacles carried thereby, each of said receptacles having its longitudinal edges bent inwardly of the receptacle into contiguous spaced relation to provide a constricted opening thereinto, and means arranged intermediate the receptacles for knocking insects into said opening.

3. An insect exterminator of the class described comprising a frame adapted to be moved over plants to be operated upon, spaced receptacles mounted on said frame, each of said receptacles having the material of its bottom extending to a point substantially centrally of the frame and then bent back toward the inner portion of the receptacle to provide a receiving surface to catch the insects, the material of the upper portion of the receptacles terminating substantially at the central portion of the bottom and coöperating with the bent portion of the bottom aforesaid to provide a mouth for the receptacle, and means for dislodging insects from the plants onto the receiving surface for delivery into the receptacle opening.

4. An insect exterminator of the class described comprising a frame, a pair of receptacles mounted in spaced relation upon said frame, each of said receptacles having a lateral opening extending longitudinally thereof and formed by bending the lateral edges of the receptacle back and inwardly of the receptacle to provide a constricted opening.

5. An insect exterminator of the class described comprising a frame, a pair of receptacles mounted thereupon in spaced relation to each other, vibratory wing extensions projecting outwardly from the receptacles and inclined downwardly toward the same, and resilient means detachably connecting said wings to the receptacles and holding said wings in offstanding position.

6. An insect exterminator of the class described comprising a frame adapted to be moved over plants to be operated upon, spaced receptacles mounted on said frame, each of said receptacles having the material of its bottom extending to a point substantially centrally of the frame and then bent back toward the inner portion of the receptacle to provide a relatively broad receiving surface to catch the insects, the material of the upper portion of the receptacles being bent downwardly and inwardly and terminating at the end of the bent portion of the bottom aforesaid to provide a mouth for the receptacle, wing extensions detachably attached to the upper portion of said receptacles for delivering insects deposited thereupon onto the receiving surfaces aforesaid, and means for dislodging insects from the plants onto the receiving surface for delivery into the receptacle opening.

In testimony whereof we affix our signatures.

CALVIN T. RUSSELL.
JOHN N. RUSSELL.

Copies of this patent may be obtained for five cents each, by addressing the "Commissioner of Patents, Washington, D. C."